J. M. ROHLFING.
CAR TRUCK BOLSTER.
APPLICATION FILED JAN. 19, 1912.
1,059,072.
Patented Apr. 15, 1913.
2 SHEETS—SHEET 1.
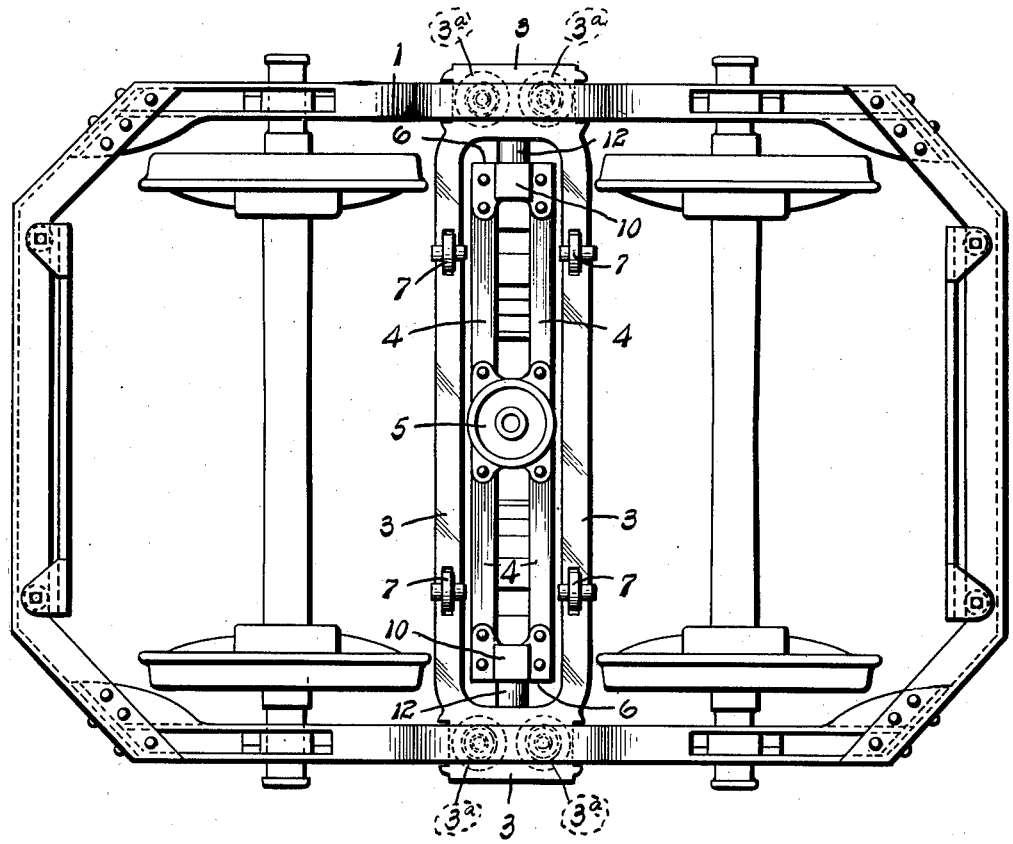
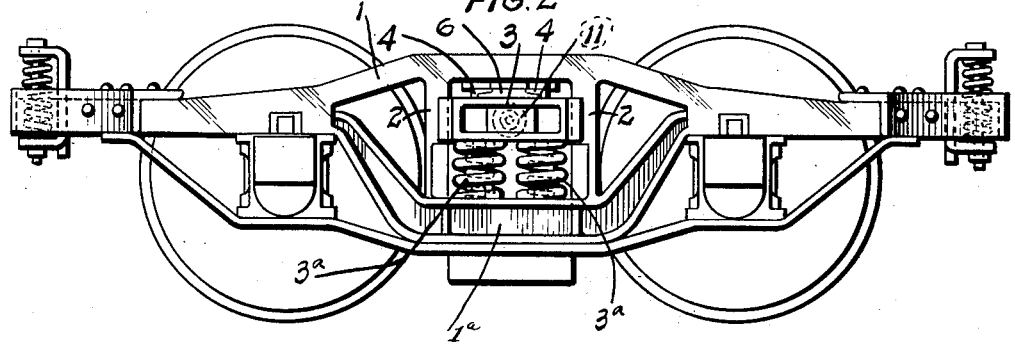
WITNESSES
INVENTOR
JOHN M. ROHLFING
BY ATT'Y.

J. M. ROHLFING.
CAR TRUCK BOLSTER.
APPLICATION FILED JAN. 19, 1912.

1,059,072.

Patented Apr. 15, 1913.
2 SHEETS—SHEET 2.

WITNESSES

INVENTOR
JOHN M. ROHLFING

UNITED STATES PATENT OFFICE.

JOHN M. ROHLFING, OF ST. LOUIS, MISSOURI, ASSIGNOR TO AMERICAN CAR AND FOUNDRY COMPANY, OF ST. LOUIS, MISSOURI, A CORPORATION OF NEW JERSEY.

CAR-TRUCK BOLSTER.

1,059,072.  Specification of Letters Patent.  Patented Apr. 15, 1913.

Application filed January 19, 1912. Serial No. 672,133.

*To all whom it may concern:*

Be it known that I, JOHN M. ROHLFING, a citizen of the United States, residing at St. Louis, Missouri, have invented a certain new and useful Improvement in Car-Truck Bolsters, of which the following is a full, clear, and exact description, such as will enable others skilled in the art to which it appertains to make and use the same, reference being had to the accompanying drawings, forming part of this specification, in which—

Figure 3:
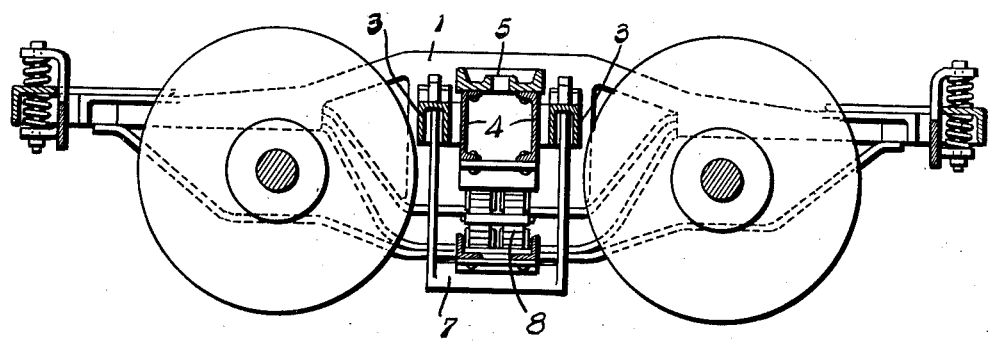
Figure 4:
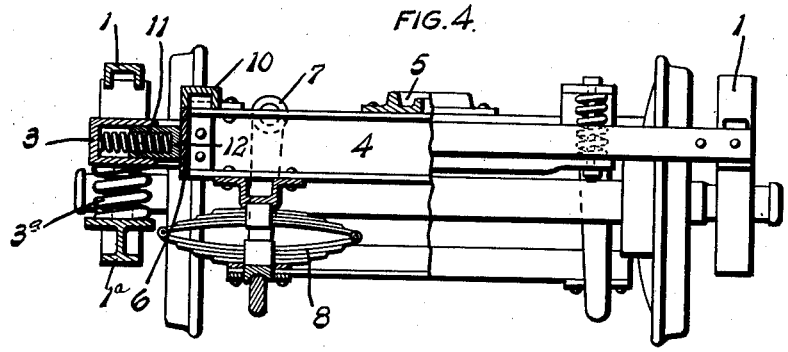

Figure 1 is a top plan view of my car truck provided with my improved bolster. Fig. 2 is a side elevational view. Fig. 3 is a vertical section, taken longitudinally through the center of my car truck, provided with my improved bolster. Fig. 4 is an end elevational view partly in vertical section.

This invention relates to a new and useful improvement in bolsters for car trucks, the object being to construct a bolster which will have the advantages of what is known as a swinging bolster and also the characteristics of a spring supported bolster, the swinging bolster being carried by the spring supported bolster which latter is mounted in the side truck frame in the usual way.

One of the particular advantages of my improved construction is that the bolster is adapted for use in connection with nearly all forms of car truck side frames of the present construction, and the bolster can be readily combined with an ordinary freight car truck and thereby obtain all the desirable features of a passenger truck frame.

Bolsters of my improved construction permit of a substantial reduction of the wheel base of trucks, which is, in some instances, very desirable.

In the drawings: 1 indicates the truck side frame provided with the usual bolster guides 2 between which is slidingly mounted a bolster member 3 supported by springs 3ª carried on the bottom arch bars 1ª.

While I have illustrated one type of truck side frame the principal member of which is cast, it is obvious that my improved bolster may be mounted in any of the well known types of truck side frames.

The bolster member 3 before referred to is shown as a casting, but it could also be made up of rolled members, the essential characteristics of this bolster member being an opening in its center in which is mounted the swinging member 4, the latter carrying the center plate 5 and being provided with side bearings 6. This swinging member 4 may rest directly upon hangers or stirrups 7 and I prefer to interpose elliptical springs 8 between the swinging member 4 and the cross carrying member of said stirrups. This swinging member 4 is shown as two rolled channels connected together at their centers by the center plate and at their ends by the spring saddle blocks and castings 10; but it is obvious that the springing member could be made of cast metal, if desired.

The ends of the spring supported bolster member 3 are formed with inwardly opening spring housing in which are located springs 11, the ends of said springs being seated in plungers 12 slidingly mounted in said spring housings and whose inner ends bear against the end walls of the swinging member 4. The plungers 12 coöperate with the inner walls of the spring housings and act as guides to keep the longitudinally movable bolster properly centered within the fixed bolster 3.

The stirrups are preferably arranged at an angle to each other so that when rounding curves, the car body which moves outwardly by centrifugal force will be tilted slightly, the hanger adjacent the inside rail of the curve lowering the car body at this side, while the hanger adjacent the outside rail curve will raise that side of the car body so as to change the position of the body and its load to counteract the tendency of the centrifugal force. In passing from a curve on to a straight track, the stirrups will swing to their normal position righting the car, being assisted by the end spring under compression. These end springs which coöperate with the swinging member of the bolster tend to yieldingly hold the same in its central position so as to resist undue motion.

What I claim is:

1. In a truck, the combination of a vertically movable bolster member spring-supported on the truck frame, a longitudinally movable member supported on said vertically movable member, housings carried by said vertically movable member, plungers carried by said longitudinally movable member and adapted to engage in said housings to guide said longitudinally movable member during its movement, and springs disposed in said housings and adapted to coöperate with said longitudinally movable member to resist endwise movement thereof.

2. The combination with truck side frames having bolster guides, of a bolster supported on said side frames comprising a spring-supported outer member, the ends of which engage the bolster guides of the side frames, and a spring-supported inner member arranged within said outer member.

3. The combination with truck side frames having bolster guides, of a bolster supported on the side frames and comprising a member having an opening, the ends of which member engage the bolster guides of the side frames, springs between said bolster member and the side frames, and a spring-supported bolster member arranged within the opening in said first mentioned member.

4. A truck construction comprising the combination of side frames including lower arch bars, springs carried by the lower arch bars, a vertically movable and longitudinally fixed bolster member carried by the said springs, and a longitudinally movable bolster member spring-supported on the vertically movable bolster member.

5. In a truck construction, the combination of side frames including lower arch bars and bolster guides, a vertically movable bolster member spring-supported on the lower arch bars and coöperating with bolster guides, and a longitudinally movable bolster member spring-supported on the vertically movable bolster member.

6. In a truck construction, the combination of side frames including lower arch bars, a vertically movable bolster member, coil springs supporting said vertically movable bolster member on said lower arch bars, a longitudinally movable bolster member, and means including elliptical spring supporting said longitudinally movable bolster member on said vertically movable bolster member.

In testimony whereof I hereunto affix my signature in the presence of two witnesses, this 8th day of January, 1912.

JOHN M. ROHLFING.

Witnesses:
PAUL M. BEARD,
JAMES J. COOPER.